United States Patent
Li

(10) Patent No.: US 8,293,401 B2
(45) Date of Patent: Oct. 23, 2012

(54) BATTERY COVER ASSEMBLY FOR PORTABLE ELECTRONIC DEVICE

(75) Inventor: Yong Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 906 days.

(21) Appl. No.: 12/354,075

(22) Filed: Jan. 15, 2009

(65) Prior Publication Data

US 2010/0143775 A1 Jun. 10, 2010

(30) Foreign Application Priority Data

Dec. 8, 2008 (CN) .......................... 2008 1 0306033

(51) Int. Cl.
 H01M 2/00 (2006.01)
 H01M 2/02 (2006.01)
 H01M 2/04 (2006.01)
 H01M 2/10 (2006.01)

(52) U.S. Cl. ........... 429/163; 429/177; 429/96; 429/176

(58) Field of Classification Search .............. 429/96–97, 429/100, 163, 175–177; 29/623.1–623.2; 379/440, 428.01, 433.11; 455/90.1–90.3, 455/550.1, 575.1, 343.1; 292/137; 361/814; 312/223.4

See application file for complete search history.

(56) References Cited

U.S. PATENT DOCUMENTS

| | | | | |
|---|---|---|---|---|
| 5,607,792 | A * | 3/1997 | Garcia et al. | 429/97 |
| 7,758,996 | B2 * | 7/2010 | Mackle et al. | 429/97 |
| 7,842,412 | B2 * | 11/2010 | Zhang et al. | 429/97 |
| 2005/0140255 | A1 * | 6/2005 | Wilson | 312/223.4 |
| 2007/0026297 | A1 * | 2/2007 | Qin et al. | 429/97 |
| 2008/0042448 | A1 * | 2/2008 | Ge et al. | 292/137 |

* cited by examiner

*Primary Examiner* — Barbara Gilliam
*Assistant Examiner* — Claire L Roe
(74) *Attorney, Agent, or Firm* — Altis Law Group, Inc.

(57) ABSTRACT

A battery cover assembly for a portable electronic device, the battery cover assembly includes a housing, a removable battery cover and a locking mechanism. The housing has a latching portion. The locking mechanism latches the battery cover to the housing, and includes an operating member, a slidable member and an elastic member. The operating member engages in the latching portion of the housing, and the operating member includes a resisting block. The slidable member releasably engages with the battery cover, and the slidable member has a support block engaging with the resisting block. The elastic member is between the slidable member and the latching portion and provides an elastic force to the slidable member and the operating member.

13 Claims, 8 Drawing Sheets

BATTERY COVER ASSEMBLY FOR PORTABLE ELECTRONIC DEVICE

BACKGROUND

1. Technical Field

The present disclosure generally relates to battery cover assemblies and, particularly, to a battery cover assembly for use in a portable electronic device.

2. Description of Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, for example, the batteries are damaged and/or dead (i.e. no longer rechargeable).

Although battery cover assemblies may be simple, the engagement between the battery cover and the housing of the mobile phone can be too firm to be easily detached from each other.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION OF THE EMBODIMENTS

Figure 1:
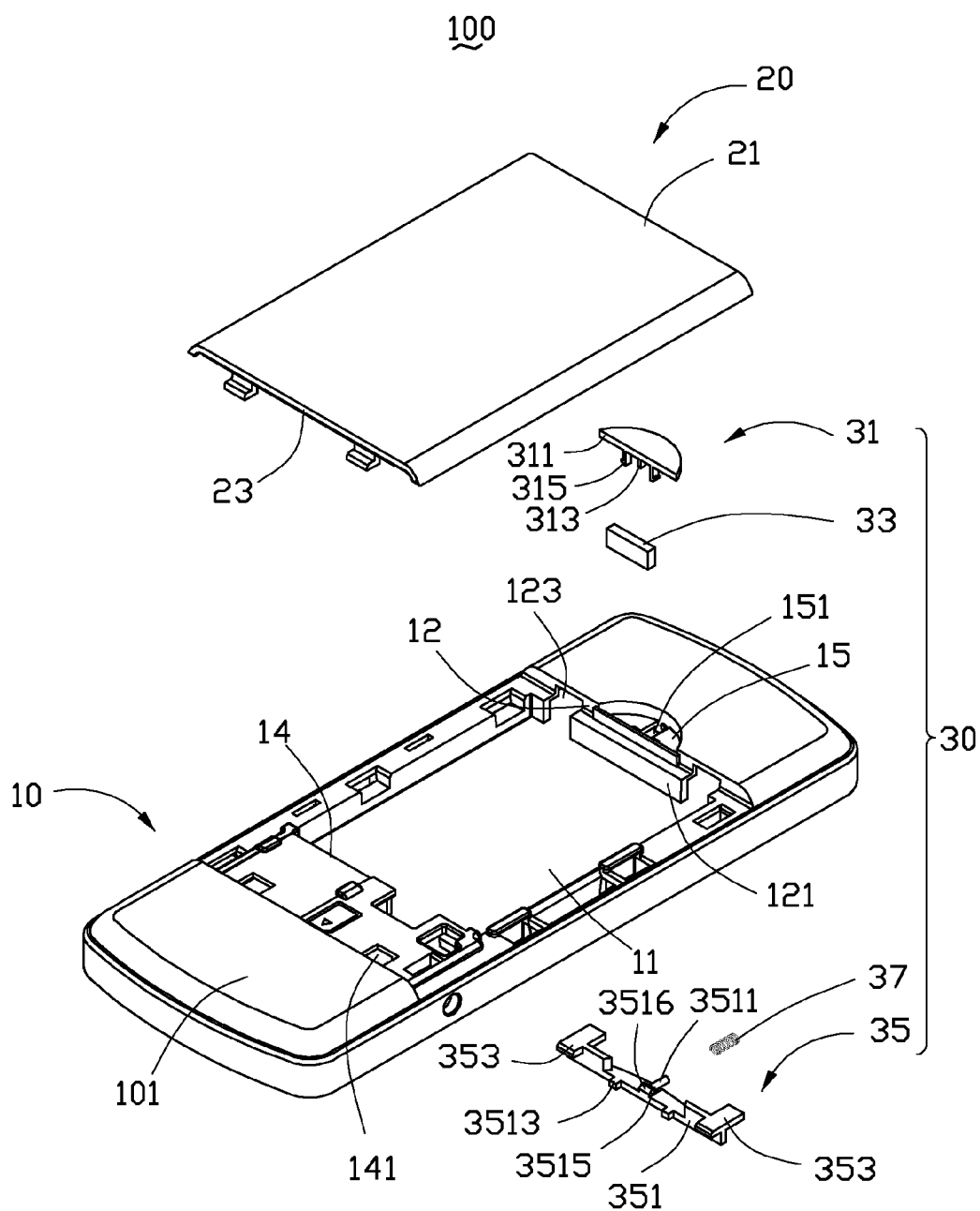
FIG. 1 is an exploded, isometric view of a portable electronic device employing a battery cover assembly in accordance with an exemplary embodiment.

FIG. 1 shows a portable electronic device 100, such as a mobile phone, employing a battery cover assembly. The mobile phone is an exemplary application of the portable electronic device 100, for the purposes of describing details of a battery cover assembly of an exemplary embodiment. The battery cover assembly incorporates a housing 10, a removable battery cover 20, and a locking mechanism 30. The locking mechanism 30 releasably latches (i.e. attaches, locks, engages) the removable battery cover 20 to the housing 10.

Figure 2:
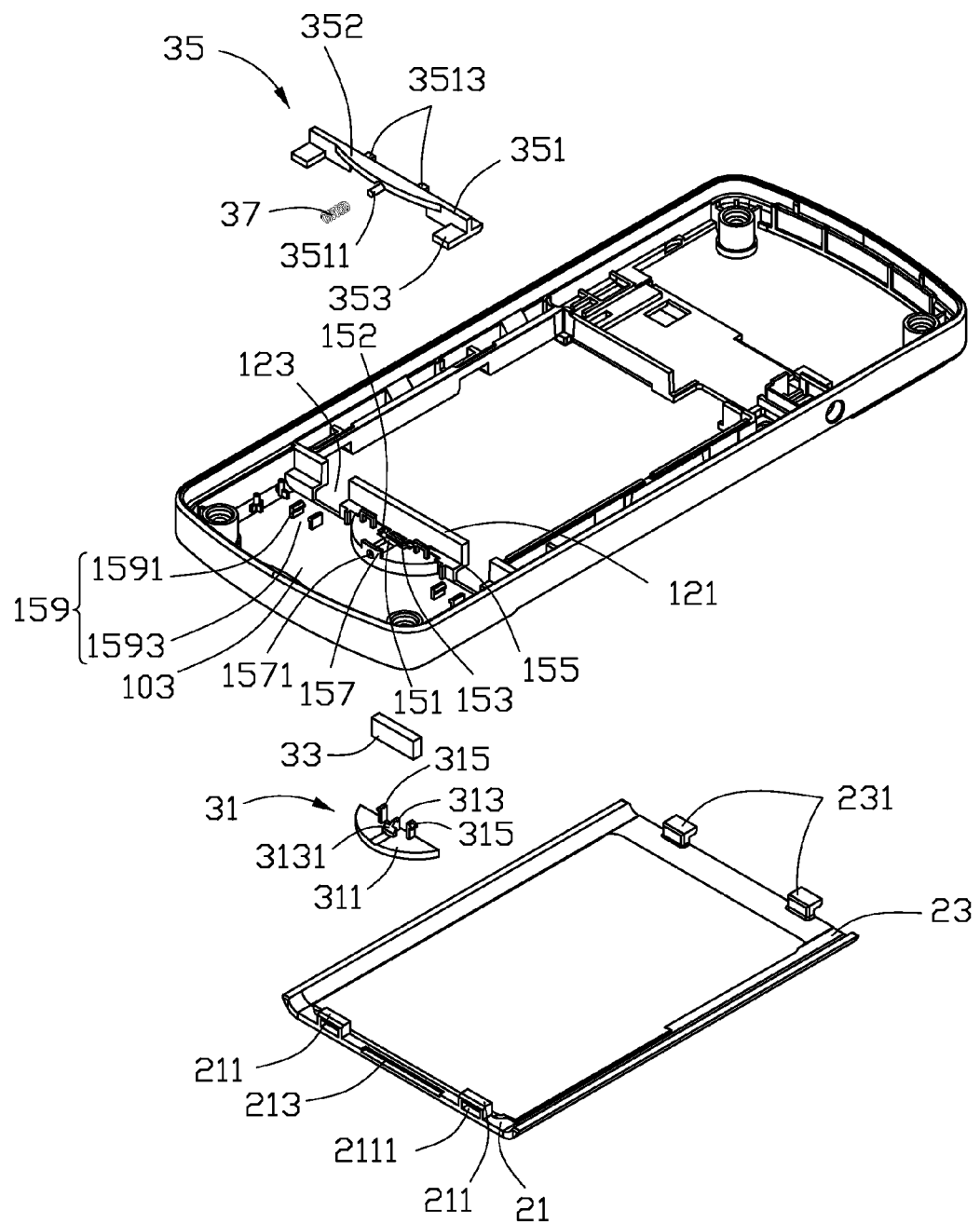
FIG. 2 is similar to FIG. 1, but viewed from another aspect.
Figure 3:
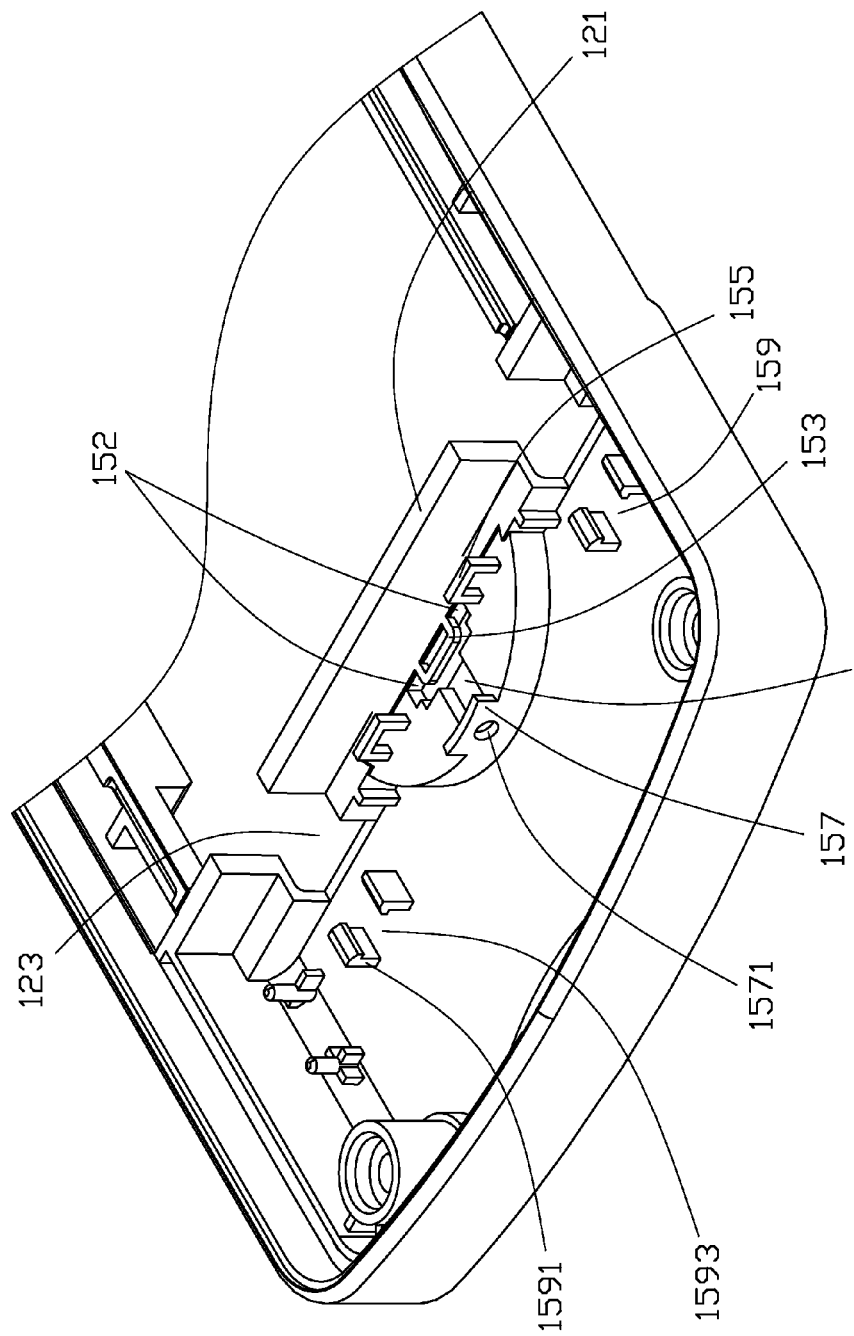
FIG. 3 is an enlarged view of one portion of the housing shown in FIG. 1.

Referring to FIGS. 1-3, the housing 10 includes a first surface 101 and an opposite second surface 103. The first surface 101 of the housing 10 is recessed to form a battery cavity 11 with a first end portion 12, and a second end portion 14. The first end portion 12 forms a stage 121 and two slots 123 defined at two sides of the stage 121. Adjacent to the stage 121, the first surface 101 is recessed to form a latching portion 15. The latching portion 15 defines a through hole 151 and two latching grooves 152. The through hole 151 communicates with the latching grooves 152.

The latching portion 15 extends some distance relative to the second surface 103. A first frame 153 extends from the stage 121. Two second frames 155 extend from the latching portion 15. The two second frames 155 are positioned at two sides of the first frame 153. An extending block 157 is formed at an edge of the latching portion 15. The extending block 157 defines a post hole 1571. The second surface 103 forms two guiding portions 159 at two sides of the latching portion 15. Each guiding portion 159 is made of two opposite hooks 1591, and is aligned with a corresponding slot 123. A guiding groove 1593 is defined between the hooks 1591. The second end portion 14 of the housing 10 defines two locking holes 141.

The removable battery cover 20 includes a first end 21 and a second end 23 opposite to the first end 21. The first end 21 forms two protrusions 211 and a receiving groove 213 therebetween. Each protrusion 211 defines a notch 2111. The second end 23 forms two L-shaped tabs 231 for being received in a corresponding locking hole 141.

The locking mechanism 30 includes an operating member 31, a buffer member 33, a slidable member 35 and an elastic member 37.

The operating member 31 includes a pressing board 311 for being mounted in the latching portion 15 of the housing 10. A resisting block 313 extends from one side of the pressing board 311. The resisting block 313 forms a resisting slope surface 3131. Two clasps 315 are respectively positioned at two sides of the resisting block 313 for being received in a corresponding latching groove 152.

The buffer member 33 is substantially rectangular, and may be received in the receiving groove 213. The buffer member 33 is made of elastic material such as rubber, or sponge. In this exemplary embodiment, the buffer member 33 is made of polyurethane. When the battery cover 20 is assembled in the housing 10, the buffer member 33 may abut the stage 121 to decrease the impact force. The buffer member 33 also may reduce the abrasion therebetween.

Figure 4:
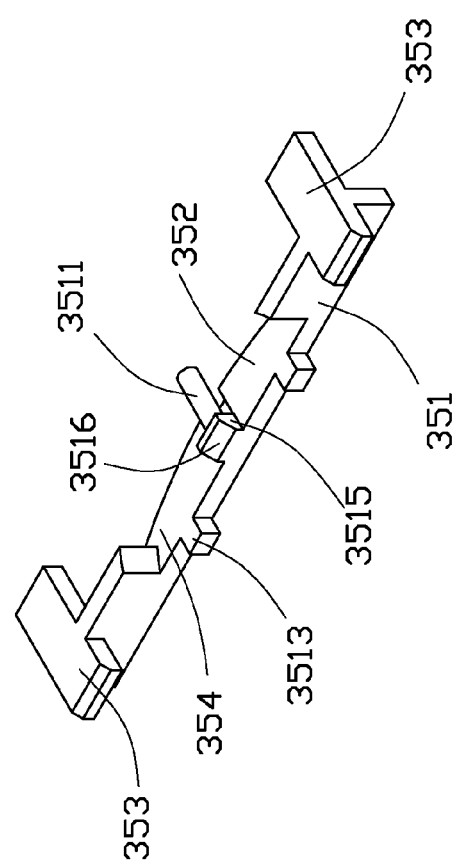
FIG. 4 is an enlarged view of the slidable member shown in FIG. 1.

Referring to FIG. 4, the slidable member 35 includes a support board 351 and an arcuate board 352. Two sliding blocks 353 respectively perpendicularly extend from two sides of the support board 351. The support board 351 defines a gap 354 in a central area thereof. The support board 351 forms two projections 3513 and a support block 3515 in the gap 354. An extending direction of the projections 3513 is parallel to the sliding blocks 353. An extending direction of the support block 3515 is perpendicular to the sliding blocks 353. The support block 3515 extends a post 3511 parallel to the sliding blocks 353. The post 3511 abuts the arcuate board 352. The support block 35 forms a support slope surface 3516 for engaging with the resisting slope surface 3131.

The elastic member 37 is a helical spring, and may be placed around the post 3511 of the slidable member 35.

Figure 5:
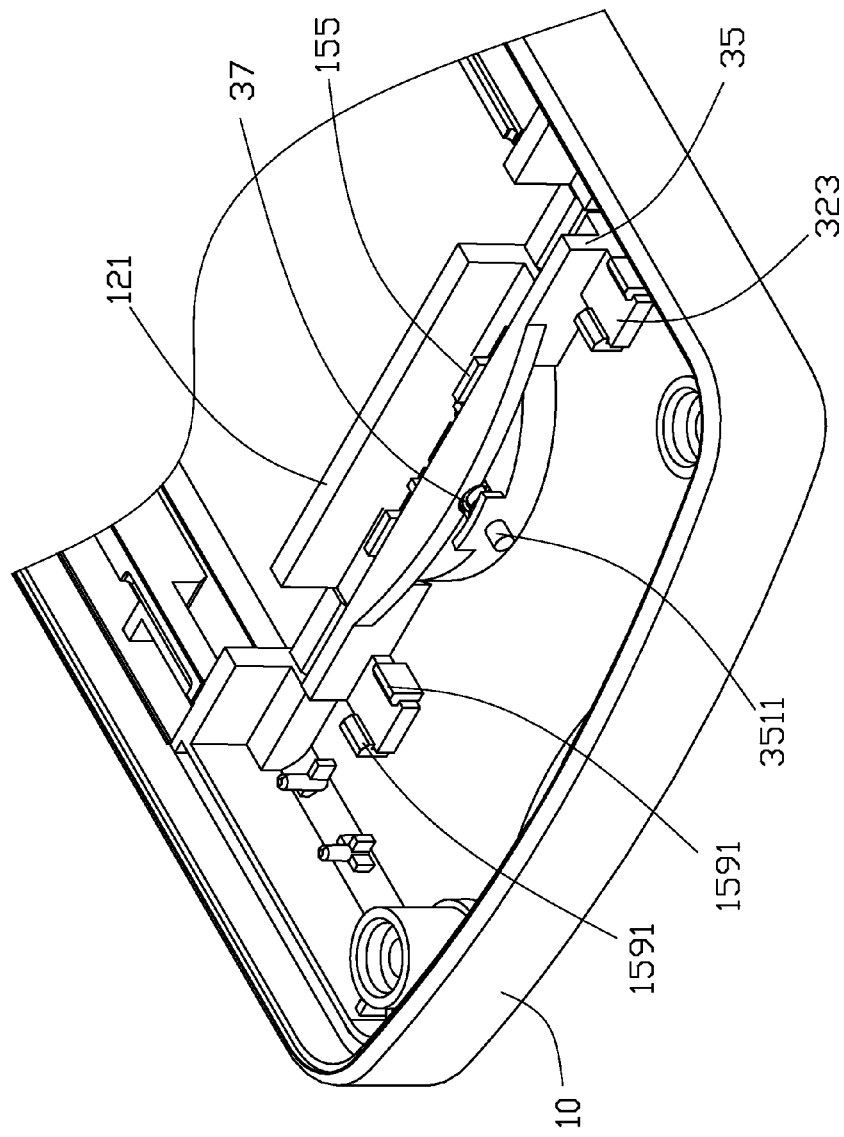
FIG. 5 is an isometric view showing the slidable element mounted in the housing of FIG. 1.
Figure 6:
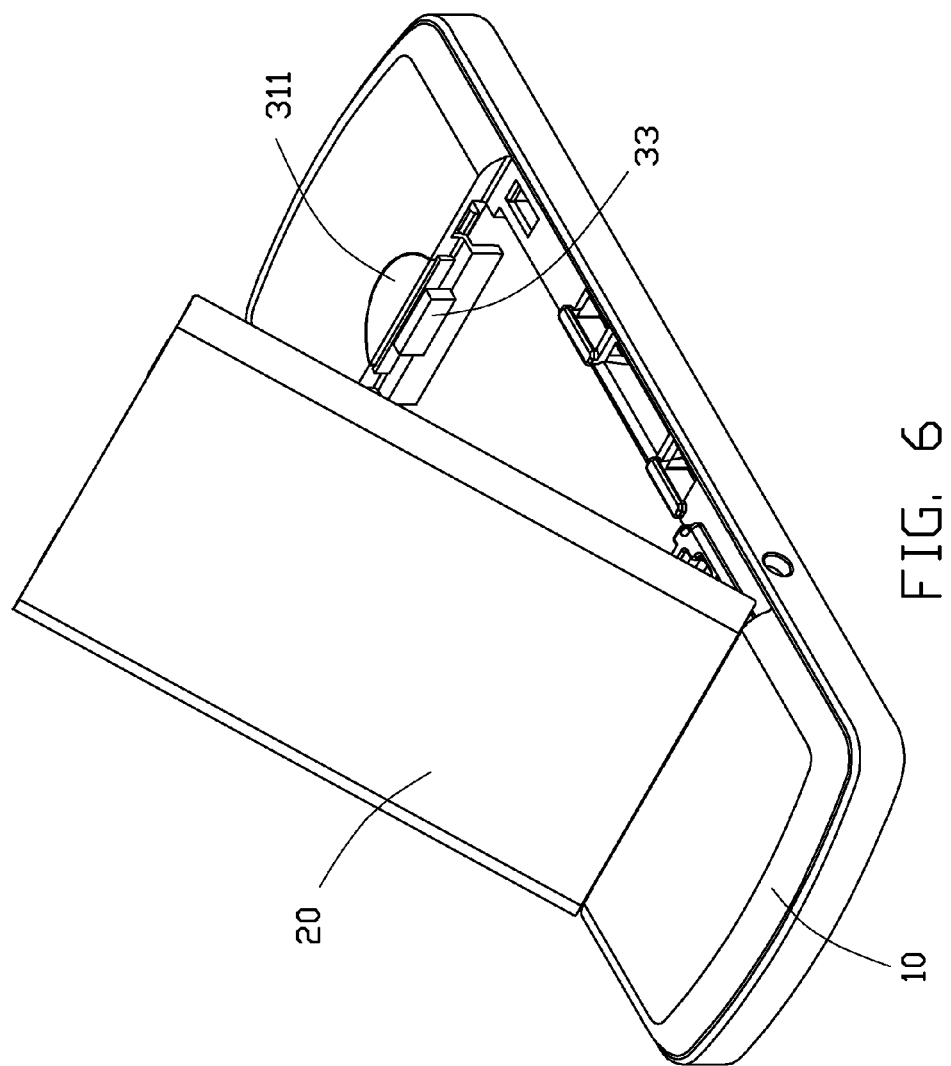
FIG. 6 is an assembly view of FIG. 1.
Figure 7:
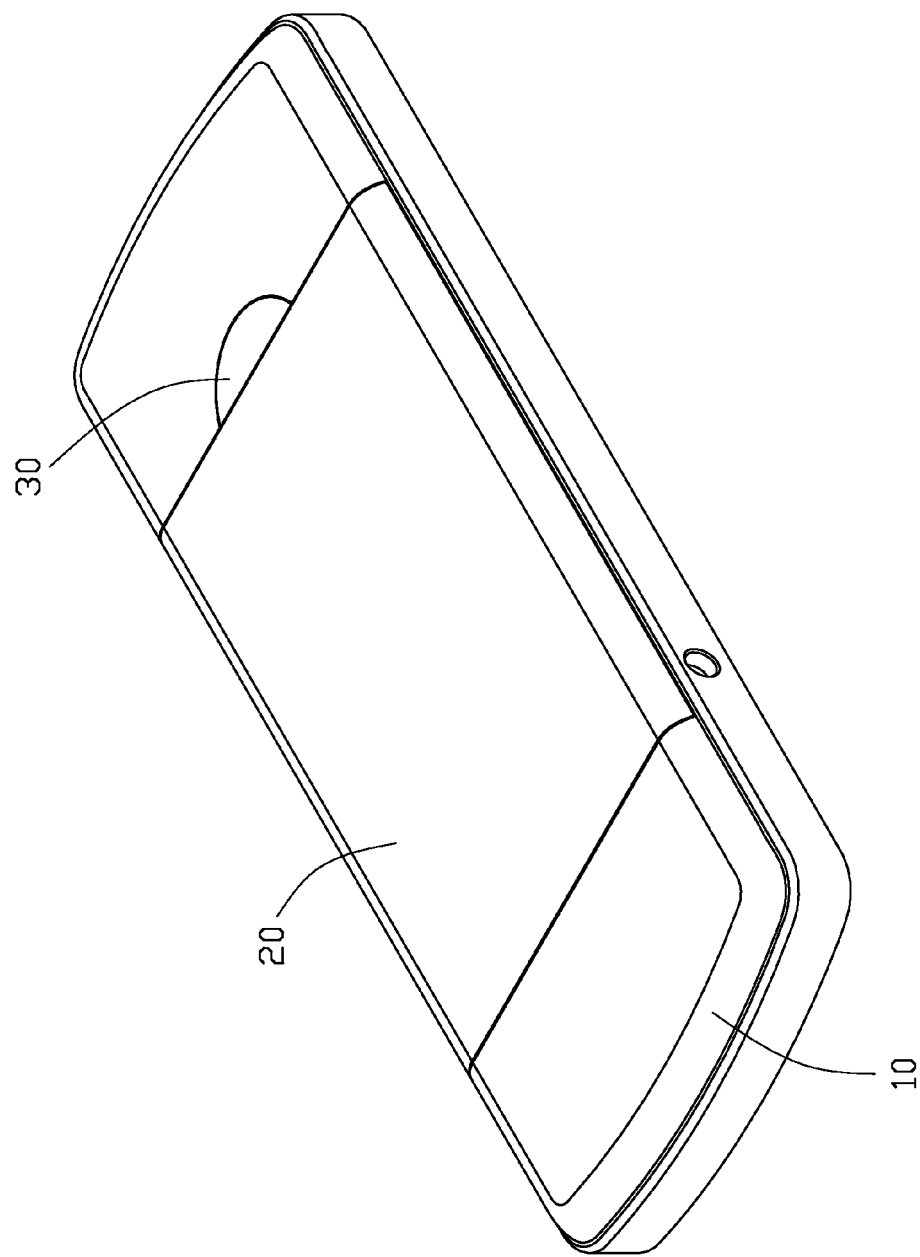
FIG. 7 is a close state view of the portable electronic device.

During assembly of the battery cover assembly of the portable electronic device 100, referring to FIGS. 5 and 7, the elastic member 37 is placed around the post 3511 of the slidable member 35, and is compressed to allow the post 3511 to pass through the post hole 1571 of the latching portion 15. At the same time, each slidable block 353 is assembled in the guiding groove 1593 of the guiding portion 159. The elastic member 37 is released, and the projections 3513 are respectively received in a corresponding second frame 155. The first frame 153 abuts the support board 351. Accordingly, the slidable member 35 is assembled to the housing 10. Then, the operating member 31 is received in the latching portion 15.

The clasps 315 pass through the latching grooves 152, and are locked in the housing 10. The resisting block 313 passes through the through hole 151, and the resisting slope surface 3131 abuts the support slope surface 3516. After that, the buffer member 33 is fixed to the stage 121 by, e.g. ultrasonic welding. Finally, the tabs 231 of the cover 20 are received in the locking hole 141, the protrusions 211 are received in the slots 123. The slidable blocks 353 are locked in the notches 2111 of the cover 20. Thus, the battery cover 20 is assembled in the housing 10.

Figure 8:
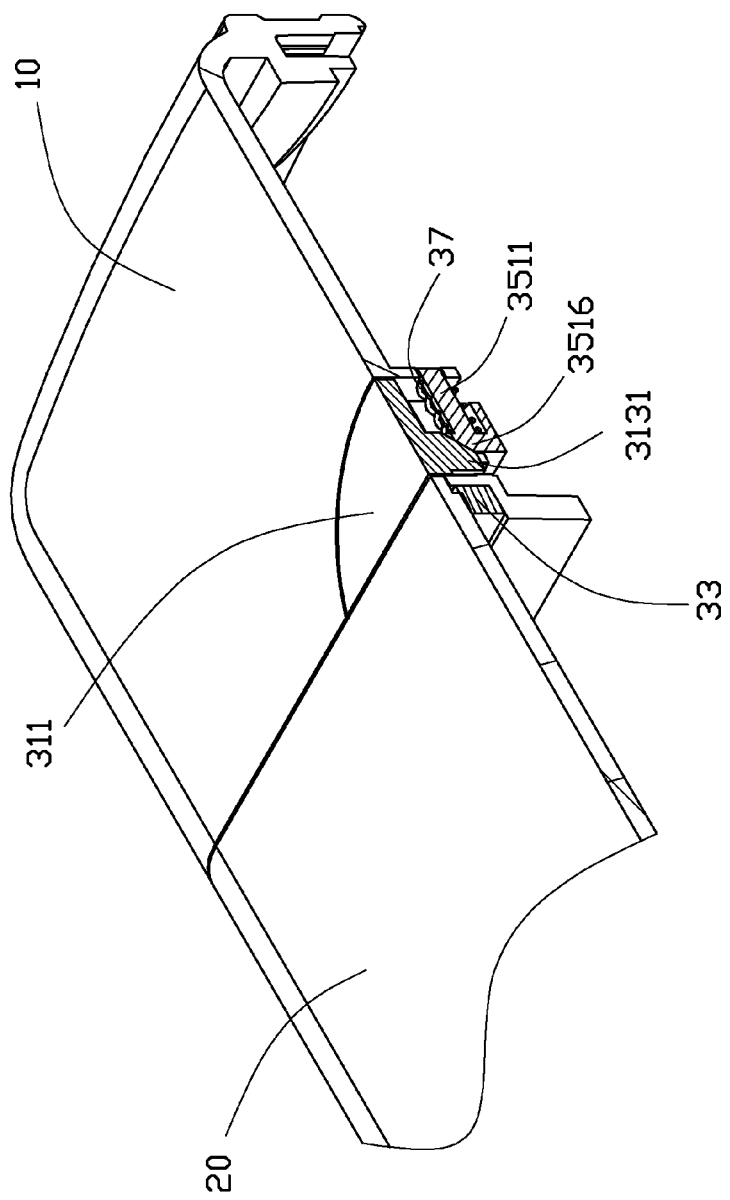
FIG. 8 is an enlarged, cut-away view of FIG. 7.

Referring to FIG. 8, to open the cover 20, the operating member 31 is pressed down to make the resisting slope surface 3131 push the support slope surface 3516. Thus, the slidable blocks 353 slide along the guiding grooves 1593 until the slidable blocks 353 exit from the guiding grooves 1593. The tabs 231 exit the locking holes 141 to detach the cover 20. The operating member 31 is automatically returned to an original position by the elastic member 37.

As described above, the exemplary embodiment provides a battery cover assembly for portable electronic devices, such as mobile phones. When the operating member is pressed, the cover of the battery cover assembly can be easily opened. This rotatable removal step makes the operation of the device more user-friendly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover assembly for a portable electronic device, the battery cover assembly comprising:
   a housing having a latching portion;
   a removable battery cover;
   a locking mechanism removably latching the battery cover to the housing, the locking mechanism comprising:
      an operating member engaging in the latching portion of the housing, the operating member including a resisting block;
      a slidable member slidably attached to the latching portion of the housing and releasably engaging with the battery cover, the slidable member including a support board and two slidable blocks, a support block perpendicularly extending from the support board and engaging with the resisting block; and
      an elastic member disposed between the support block and the latching portion to provide an elastic force to the slidable member and the operating member.

2. The battery cover assembly as claimed in claim 1, wherein the latching portion defines a through hole, the resisting block forms a resisting slope surface, the support block forms a support slope surface, the resisting block passes through the through hole, and the resisting slope surface abuts the support slope surface.

3. The battery cover assembly as claimed in claim 2, wherein the latching portion defines two latching grooves at two sides of the through hole, the operating member forms two clasps respectively positioned at two sides of the resisting block, the two clasps are locked with the latching groove.

4. The battery cover assembly as claimed in claim 1, wherein the latching portion has two frames extending therefrom, the support board forms two projections at two sides of the support block, the projections are received in the frames.

5. The battery cover assembly as claimed in claim 4, wherein the housing forms two guiding portions at two sides of the latching portion, the slidable blocks are received in the guiding portions.

6. The battery cover assembly as claimed in claim 5, wherein the housing forms a stage and two slots defined at two sides of the stage, and the latching portion is adjacent to the stage, and the slidable blocks pass through the slots.

7. The battery cover assembly as claimed in claim 6, wherein the cover forms two protrusions, and each protrusion defines a notch, and the slidable blocks are received in the notches.

8. The battery cover assembly as claimed in claim 1, wherein the cover defines a receiving groove, a buffer member is received in the receiving groove.

9. The battery cover assembly as claimed in claim 1, wherein the support block includes a post, and the elastic member is placed around the post.

10. A portable electronic device comprising:
    a housing having a latching portion, the latching portion defining a through hole;
    a removable battery cover;
    a locking mechanism latching the battery cover to the housing, the locking mechanism comprising:
       an operating member engaging in the latching portion of the housing, the operating member including a resisting block, the resisting block forming a resisting slope surface; and
       a slidable member releasably engaging with the battery cover, the slidable member having a support block engaging with the resisting block, the support block forming a support slope surface, the resisting block passing through the through hole, and the resisting slope surface abutting the support slope surface.

11. The portable electronic device as claimed in claim 10, wherein the latching portion has two frames extending therefrom, the slidable member includes a support board and two slidable blocks, the support board forms two projections at two sides of the support block, the projections are received in the frames.

12. The portable electronic device as claimed in claim 10, further comprising a buffer member, wherein the cover defines a receiving groove, the buffer member is received in the receiving groove.

13. The portable electronic device as claimed in claim 10, further comprising an elastic member, wherein the support block includes a post, and the elastic member is placed around the post.

* * * * *